United States Patent
Abels et al.

(10) Patent No.: US 11,704,109 B2
(45) Date of Patent: Jul. 18, 2023

(54) SYSTEM AND METHOD FOR UPDATING FIRMWARE OF A COOKING APPARATUS

(71) Applicant: Vorwerk & Co. Interholding GmbH, Wuppertal (DE)

(72) Inventors: Michael Abels, Pulheim (DE); Katharina Utzig, Essen (DE); Mirco Pieper, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 17/452,798

(22) Filed: Oct. 29, 2021

(65) Prior Publication Data

US 2022/0137952 A1   May 5, 2022

(30) Foreign Application Priority Data

Oct. 29, 2020   (EP) ..................................... 20204654

(51) Int. Cl.
*G06F 8/65* (2018.01)
*H04W 4/30* (2018.01)
(Continued)

(52) U.S. Cl.
CPC .................. *G06F 8/65* (2013.01); *G06F 8/71* (2013.01); *H04L 67/34* (2013.01); *H04W 4/30* (2018.02); *H04W 4/80* (2018.02)

(58) Field of Classification Search
None
See application file for complete search history.

(56) References Cited

U.S. PATENT DOCUMENTS 8,855,563 B2 * 10/2014 Yamaoka ........... G06K 7/10198
455/41.1
10,595,660 B2 * 3/2020 Patadia .................... A47J 27/04
(Continued)

FOREIGN PATENT DOCUMENTS

CN     109431228 A    3/2019
WO    2020008414 A1   1/2020

OTHER PUBLICATIONS

Search Report for European Application No. 20204654.6, dated May 3, 2021, 11 pages.

*Primary Examiner* — Marina Lee
(74) *Attorney, Agent, or Firm* — Brake Hughes Bellermann LLP

(57) ABSTRACT

Techniques for updating the firmware of a second cooking apparatus under the control of a first cooking apparatus controlling recipe execution by the first and second cooking apparatuses in a joint cooking process. The first cooking apparatus queries an update server to check if the current firmware version of the second cooking apparatus corresponds to the latest available firmware version for providing a particular cooking function. If the latest firmware version differs from the current firmware version, the latest firmware version is downloaded to the first cooking apparatus. The downloaded latest firmware version is uploaded to the second cooking apparatus while preventing interruption of the joint cooking process. Completion of the firmware update is registered by the first cooking apparatus after receipt of a confirmation from the second cooking apparatus. The first cooking apparatus the sends the recipe instructions for performing the particular cooking function to the second cooking apparatus.

16 Claims, 7 Drawing Sheets

(51) Int. Cl.
*H04W 4/80* (2018.01)
*G06F 8/71* (2018.01)
*H04L 67/00* (2022.01)

(56) References Cited

U.S. PATENT DOCUMENTS

| | | |
|---|---|---|
| 2003/0121032 A1 | 6/2003 | Cho et al. |
| 2004/0039826 A1* | 2/2004 | Lee .................. H04L 12/281 |
| | | 709/228 |
| 2007/0158335 A1* | 7/2007 | Mansbery ............ H05B 6/6435 |
| | | 219/505 |
| 2016/0014849 A1* | 1/2016 | Hegedis ................ G01K 1/143 |
| | | 219/627 |
| 2017/0224148 A1* | 8/2017 | Koennings ............. G05B 15/00 |

* cited by examiner

SYSTEM AND METHOD FOR UPDATING FIRMWARE OF A COOKING APPARATUS

CROSS-REFERENCE TO RELATED APPLICATION

This application claims priority to EP Patent Application No. EP20204654.6, filed on Oct. 29, 2020 and entitled "System and method for updating firmware of a cooking apparatus," the disclosure of which is hereby incorporated by reference in its entirety.

TECHNICAL FIELD

The present disclosure generally relates to cooking apparatuses, and more particularly, relates to providing firmware updates to one or more cooking apparatuses.

BACKGROUND

Cooking apparatuses (cooking devices) have become more and more intelligent in the recent past by integrating multiple functions into the apparatus. For example, modern cooking devices integrate functions, such as heating, mixing, boiling, pureeing, etc., in a single multi-function cooking device. A cooking device typically has to be operated with appropriate technical parameter settings (e.g., temperature settings, rotational speed settings, etc.) to ensure proper operation. Proper operation of a cooking device as used hereinafter refers to correct, safe and/or secure operation for producing reproducible cooking results with the cooking apparatus with regards to a particular food product.

Typically, the functions of such a multi-functional cooking apparatus are controlled by one or more recipe programs which have instructions that are sequentially executed to arrive at the prepared food product or menu. Typically, a recipe program is loaded into the cooking apparatus for preparing a certain course of the menu and the courses are prepared by processing the separate recipe programs in the corresponding sequence. However, a recipe program may also include program instructions related to food processing steps of two or more courses (or the entire menu). The preparation of complex food products resulting from such complex food processing steps often require the use of one or more further cooking apparatuses to allow parallel execution of certain recipe instructions on multiple cooking apparatuses. This becomes particularly relevant in scenarios where a food component which can be prepared by one of the further cooking apparatus needs to be provided to a lead apparatus at a certain point in time to ensure a smooth joint cooking process leading to reproducible cooking result.

Typically, the cooking apparatuses used in such a joint cooking process are under the control of the lead cooking apparatus which is distributing respective partitions of the recipe program to the other cooking apparatuses for execution. Such other cooking apparatuses are subordinate to the lead apparatus in that the collaboration of the lead apparatus with the other cooking apparatuses in the joint cooking process is coordinated by the lead apparatus. That is, the lead apparatus determines which of the other cooking apparatuses will be used for execution of respective recipe instructions. The other cooking apparatus may be of different types. Although, a second cooking apparatus may be of the same type as the lead apparatus, often the second cooking apparatus has a more limited functional scope than the lead apparatus. That is, for example, it may support a lower maximum cooking temperature, or lower maximum rotational speed of stirring/chopping elements in comparison with the lead apparatus. To some extent, the functional scope of such a second cooking apparatus is determined by the firmware used for operating the second cooking apparatus. Firmware updates may be used to enhance the cooking functions provided by the second cooking apparatus. In some cases, such firmware updates may be required to execute a particular recipe in a joint cooking process. It is to be noted that "cooking function" as used herein refers to any action which can be performed by a cooking apparatus in the course of processing recipe instructions. That is, a cooking function does not necessarily involve a heating step. Also functions such as chopping or stirring are referred to as cooking functions.

SUMMARY

There is therefore a need to enable firmware updates for the second cooking apparatus without negative effects on the joint cooking process. This technical problem is solved by embodiments as claimed by the independent claims: a computer-implemented method for updating the firmware of a second cooking apparatus under the control of a first cooking apparatus (the lead apparatus); a computer-program product which, when being executed by at least one processor, causes the at least one processor to execute the steps of said computer-implemented method; and a lead cooking apparatus for updating the firmware of a second cooking apparatus.

The features for achieving the firmware update with such embodiments without a negative effect on the joint cooking process are summarized in the following.

In one embodiment, a computer-implemented method is provided for updating the firmware of a second cooking apparatus under the control of a first cooking apparatus. The first cooking apparatus (the lead apparatus) is associated with a recipe control function which controls recipe execution by the first and second cooking apparatuses in a joint cooking process. The recipe control function includes at least a recipe program storage and a recipe execution engine which may be an integral part of the lead apparatus. Further functions of a recipe control function may also be implemented outside the lead apparatus in that a respective control unit, which is not an integral part of the lead apparatus, implements such functions and is communicatively coupled with the lead apparatus. For example, a recipe analysis module and a recipe partitioning module for generating recipe programs for execution by further cooking apparatuses participating in the joint cooking process with the lead apparatus may be performed by a computing device which is communicatively coupled with the lead apparatus, but which does not form an integral component of the lead apparatus. That is, a recipe program is initially processed by the lead apparatus. Recipe instructions which are to be executed by the second or further cooking apparatuses are then distributed to the respective apparatuses to be executed for performing respective cooking functions in the joint cooking process.

While the lead apparatus processes a recipe program with recipe instructions to be executed by the second cooking apparatus for performing a particular cooking function, the lead apparatus recognizes that the second cooking apparatus is needed for successfully performing the joint cooking process. The lead apparatus may take notice of such need already before starting the execution of the recipe program (by scanning the entire program before execution), or it may take notice during recipe execution when processing a recipe instruction is to be sent to the second cooking apparatus. The lead apparatus then checks whether there is already a communication established between the two cooking apparatuses which allows the lead and second cooking apparatus to communicate with each other. For this purpose, the two cooking apparatuses connect via a wireless short-range communication protocol. In case there is no connection, the lead apparatus may generate an instruction to switch on the second cooking apparatus. For example, the instruction may be sent to a cooking user. The user may then switch on the required second cooking apparatus and the second cooking apparatus may send a connection request to the lead apparatus. It is assumed that the two cooking apparatuses were already paired in the past using a standard wireless short-range communication protocol (e.g., WLAN, Bluetooth, Zigbee, UWB, etc.). If pairing has not been done, pairing can be performed once the second cooking apparatus has been turned on.

Once the communication has been established between the two cooking apparatuses, the lead apparatus queries the second cooking apparatus for the version number of the firmware currently used by the second cooking apparatus. The lead apparatus then queries an update server to check if the current firmware version of the second cooking apparatus corresponds to the latest available firmware version for providing the particular cooking function. In other words, the particular cooking function can be enabled on the second cooking apparatus by installing the respective latest available firmware version thereon. The update server may be a remote server (e.g., a cloud server) which is communicatively coupled with the lead apparatus via a wide area communication network (e.g., the Internet).

In one implementation, the lead apparatus may send the current firmware version number to the update server and, in response receive the information from the update server whether a newer version is available. In an alternative implementation, the lead apparatus may simply request the latest firmware version number for the second cooking apparatus from the update server and perform the check whether the latest version number is newer than the current version number on its own.

If the latest firmware version differs from the current firmware version—that is, in case a newer firmware version is available for the second cooking apparatus—the latest firmware version is downloaded from the upload server to the first cooking apparatus (lead apparatus). In some embodiments, the download may depend on a user confirmation. In such embodiments, the lead apparatus prompts a user with the information that a newer firmware version is available and asks the user to confirm whether the latest version should be installed or at least downloaded for later installation. If the user provides the confirmation, the download is executed. In an alternative implementation, the download may always be performed when the lead apparatus detects availability of a newer firmware version. In such an implementation, user confirmation for approving the update of the firmware of the second cooking apparatus may be performed after the download. For example, the user may be informed after the download that a newer firmware version is available—or even that a newer firmware version is required to continue the joint cooking process—and the user can confirm that the firmware update should be installed. It may be advantageous to download available firmware updates without prior user confirmation in particular if the firmware update is a required update for enabling the particular cooking function of the second cooking apparatus which is required for a successful recipe execution in the joint cooking process. In such case, the required firmware update is already pre-loaded by the lead apparatus and can be installed immediately when needed. This reduces the risk of disturbing the joint cooking process because, for example, the connection to the update server would be slow or even not available when the firmware update is required.

Once the latest firmware version has been downloaded to the lead apparatus, the latest firmware version is uploaded to the to the second cooking apparatus. The upload is performed while preventing any interruption of the joint cooking process to guarantee successful execution of an ongoing joint cooking process. This is achieved by either preventing or interrupting firmware uploads when an ongoing cooking action is detected, or by interrupting an ongoing cooking action of the second cooking apparatus for performing the firmware update if such interruption does not negatively affect the food quality achieved by the interrupted cooking action and does not negatively affect the overall timing of the joint recipe execution.

An interruption which prevents successful execution of the joint cooking process is any interruption caused by the firmware update which would cause the second cooking apparatus to provide an intermediate cooking result in the joint cooking process either with a critical time delay or with insufficient food quality. For example, a critical time delay can occur when a food component to be prepared by the second cooking apparatus has to be ready at a particular point in time during the joint cooking process (e.g., because the food component is then needed for further processing by the lead apparatus, or is needed at the end of the joint cooking process together with other food components to be served simultaneously), and this deadline (the particular point in time) is missed because of the firmware update activities. For example, insufficient food quality can occur, when a reproducible cooking result provided by certain cooking function of the second cooking apparatus depends on continuous execution of the cooking function (e.g., whipping cream) but the ongoing cooking function is nevertheless interrupted by the firmware update and resumed after the update. This typically leads to a low-quality food component which can be detrimental for the overall cooking result of the joint cooking process.

Various embodiments can be used to prevent such interruptions. In one embodiment, an ongoing cooking function performed by the second cooking apparatus is interrupted by the firmware update without taking the successful execution of the joint cooking process at risk. In this embodiment, the lead apparatus detects a current execution of a cooking function by the second cooking apparatus before starting the uploading of the firmware. Based on the recipe information, the lead apparatus can determine if the interruption of the current execution of the cooking function for updating the firmware allows to finish the cooking function by the second cooking apparatus so that the result of the executed cooking function is provided by the second cooking apparatus in accordance with the recipe for the joint cooking process.

For example, cooking functions in the recipe can be flagged as "interruptible" or "non-interruptible". A cooking function is interruptible when the interruption has no negative effect on the food quality of the output of the corresponding cooking action. "Whipping cream" may be an example for a "non-interruptible" cooking function because the moment the process would be interrupted the intermediate cooking result starts to deteriorate and, even when resuming the whipping after an interruption for performing the firmware update, the quality of the food component "whipped cream" could not be achieved anymore. "Chopping onions" may be an example for an "interruptible" cooking function, because partially chopped onions stay in a stable state when the chopping process is interrupted and the chopping could be resumed after termination of the firmware update without any quality loss of the final food component "chopped onions".

In case the currently executed cooking function is "non-interruptible", the firmware update is not performed until the cooking function is finished. In case of an "interruptible" cooking function, the lead apparatus further determines if an interruption of the ongoing cooking function would still allow the second cooking apparatus to provide the cooking result of the ongoing cooking function in due time in accordance with the recipe, thus allowing the successful completion of the joint cooking process.

If the checks indicate that the firmware update is indeed possible without taking the overall result of the joint cooking process at risk, the lead apparatus sends pause instructions to the second cooking apparatus and stores the current cooking parameters. While the second cooking apparatus is pausing, the lead apparatus uploads the latest firmware version to the second cooping apparatus. Depending on the communication protocol such upload may be performed chunk-wise. Once the firmware update is completed, the lead apparatus sends instructions to the second cooking apparatus to resume recipe execution with the stored cooking parameters. It is to be noted that the completion of the firmware update may require a reboot of the second cooking apparatus before the interrupted cooking function can be resumed.

Two alternative embodiments allow to perform the firmware update in such a manner that any interruption of an ongoing a cooking function performed by the second cooking apparatus is prevented entirely.

In a first embodiment, the lead apparatus has started a firmware upload at a moment where the second cooking apparatus was idle (i.e., no ongoing cooking function was performed by the second cooking apparatus). If the lead apparatus detects that the second cooking apparatus is starting a cooking function (e.g., the heating function is turned on and the lead apparatus is informed that the current ingredients in the second cooking apparatus will be kept a certain temperature for a certain time interval) the lead apparatus immediately cancels the firmware uploading and resumes uploading when the second cooking apparatus has terminated the current execution.

In a second embodiment, the lead apparatus sends the latest firmware version to a firmware buffer of the second cooking apparatus. The firmware buffer is not affecting a current cooking operation of the second cooking apparatus. In this embodiment, the current machine parameters are buffered in a memory area which is not overwritten by the firmware update. In one implementation, the second cooking apparatus may further have a machine parameter buffer for mirroring current machine parameters of the current cooking operation. In this implementation, the firmware update process is robust in that it does not matter if the memory area storing the machine parameters is at least partially overwritten by said firmware update. After the completion of the firmware upload, the second cooking apparatus activates the latest firmware version during the execution of the current cooking operation by switching respective memory areas in the second cooking apparatus. That is, the memory area with the current firmware is switched to the corresponding memory address in the firmware buffer. If the machine parameter buffer is used, also the memory area with the current machine parameters is switched to the corresponding memory address in the machine parameter buffer. This embodiment allows a seamless firmware update process by performing the firmware upload while the second cooking apparatus is in operation without disturbing the joint cooking process at all. It is to be noted that this embodiment does not require a reboot of the second cooking apparatus either. Of course, if a particular cooking function of the second cooking apparatus is needed for successful recipe execution of the joint cooking process, the lead apparatus ensures that the corresponding recipe instructions will not be executed before the firmware update has been completed. That is, any ongoing cooking function must already be supported by the current firmware version of the second cooking apparatus. In other words, the "memory switch" embodiment can be used in such cases where the currently performed cooking functions is properly supported by the current firmware version but a cooking function to be performed at a later point in time in the joint cooking process requires said firmware update.

Once the firmware update of the second cooking apparatus is completed, the lead apparatus registers the completion of the firmware update after receipt of a confirmation from the second cooking apparatus and the lead apparatus sends the recipe instructions for performing the particular cooking function (which required the firmware update) to the second cooking apparatus to continue the joint cooking process by executing the respective instructions of the recipe program. To continue the joint cooking process as used herein includes a) to progress with the analysis of the recipe program in a preparation phase to prepare the distribution of particular recipe instructions to one or more respective connected cooking apparatuses, as well as b) to progress with the execution of particular recipe instructions by either performing the recipe instruction via the lead apparatus or sending the instruction to a corresponding connected cooking apparatus for execution. As a consequence, the herein disclosed firmware updating procedure ensures proper recipe execution by the second cooking apparatus because any failure resulting from an attempt to execute recipe instruction for which the second cooking apparatus would technically not be prepared is prevented. The update procedure ensures that the firmware updates are always performed in a way that the joint cooking process is not negatively affected by the firmware update (e.g., because of delays of cooking steps or insufficient food-quality of food components prepared by the second cooing apparatus).

In one embodiment, the recipe control function associated with the lead apparatus is communicatively coupled with a recipe storage which provides recipes for download to a respective storage section of the recipe control function. The recipe control function may be configured to only download recipes which are supported by the available cooking apparatuses. After the lead apparatus has registered that the second cooking apparatus has updated its firmware to the latest version, the lead apparatus can update a list of all cooking functions which are supported by the lead apparatus and by one or more cooking apparatuses connected to the lead apparatus for executing joint cooking processes. The lead apparatus can request from the recipe storage to receive only recipes which are executable with the available cooking apparatuses. In other words, recipes provided by the recipe storage are filtered to only include recipes that require cooking functions in compliance with the installed firmware versions. That is, in case at least one additional cooking function has been enabled for the second cooking apparatus by the firmware update, the range of recipes which can be provided to the lead apparatus for successful joint cooking execution, is widened by such recipes which require support of the additional cooking function in addition to the already previously supported cooking.

In one embodiment, a computer-program product is provided which has program instructions that can be loaded into the memory of a computing device and which can be executed by one or more processors of said computing device. When the program instructions are executed, they cause the computing device to execute the steps of the herein disclosed computer-implemented method.

In one embodiment, first cooking apparatus is provided for updating the firmware of a second cooking apparatus. For that purpose, the first cooking apparatus may include a computing component which can perform the functions of said computing device. The first cooking apparatus is associated with a recipe control function which controls recipe execution by the first and second cooking apparatuses in a joint cooking process. The first cooking apparatus is communicatively coupled with an update server providing firmware updates, and further has an interface to establish a communication with the second cooking apparatus upon request. A recipe processor of the first cooking apparatus is configured to process a recipe program with recipe instructions to be executed by the second cooking apparatus (220) for performing a particular cooking function in the joint cooking process.

A firmware update module of the first cooking apparatus is configured to retrieve the current firmware version of the second cooking apparatus, and to query the update server to check if the current firmware version of the second cooking apparatus corresponds to the latest available firmware version for providing the particular cooking function. If the latest firmware version differs from the current firmware version, the firmware update module downloads the latest firmware version, uploads the downloaded latest firmware version to the to the second cooking apparatus while preventing interruption of the joint cooking process, and registers completion of the firmware update after receipt of a confirmation from the second cooking apparatus. Then, the first cooking apparatus sends the recipe instructions for performing the particular cooking function to the second cooking apparatus to continue the joint cooking process by executing respective instructions of the recipe program.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

DETAILED DESCRIPTION

Figure 1A:
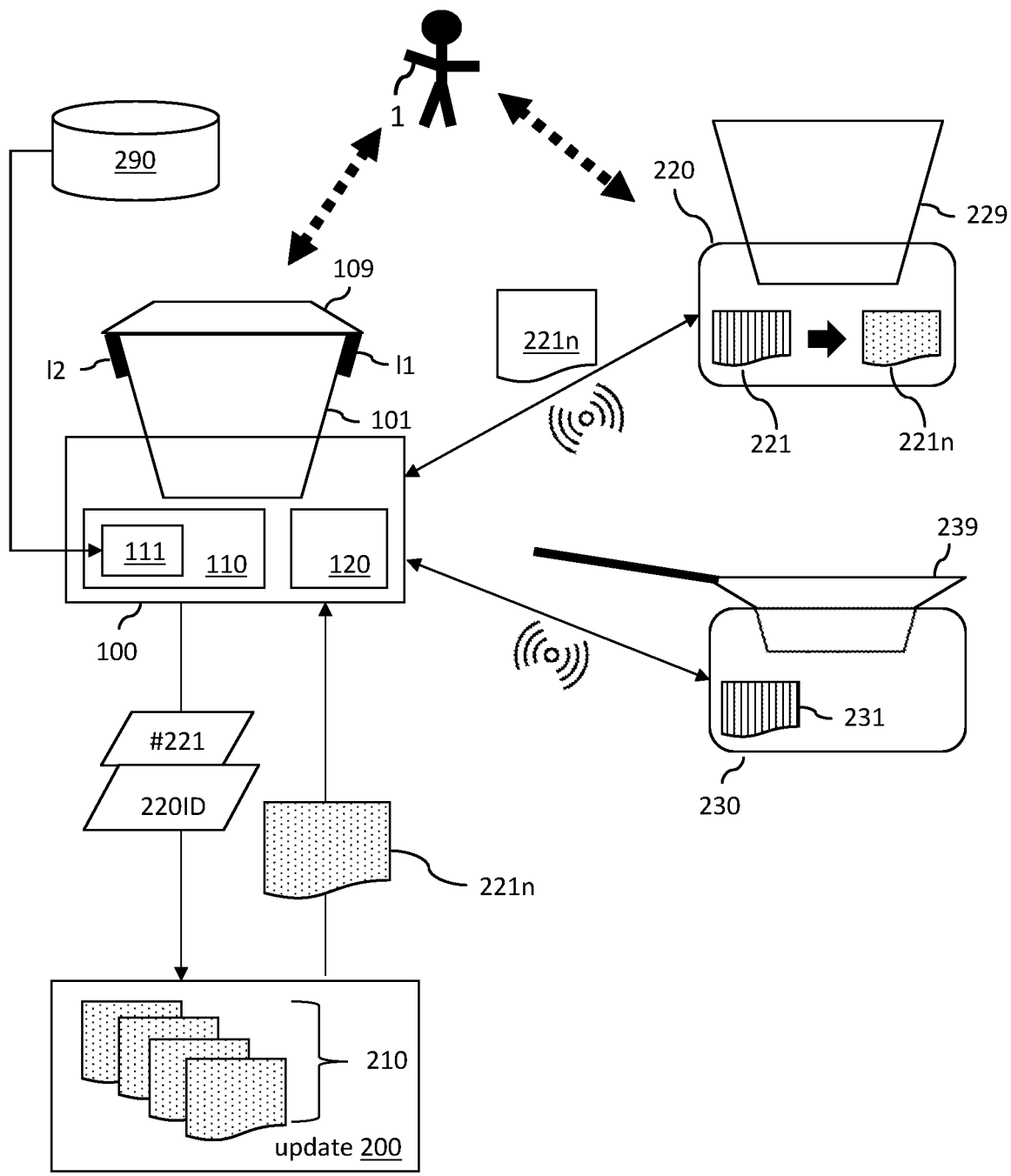
FIG. 1A illustrates a lead cooking apparatus with two further cooking apparatuses in a joint cooking process example scenario according to an embodiment.
Figure 2:
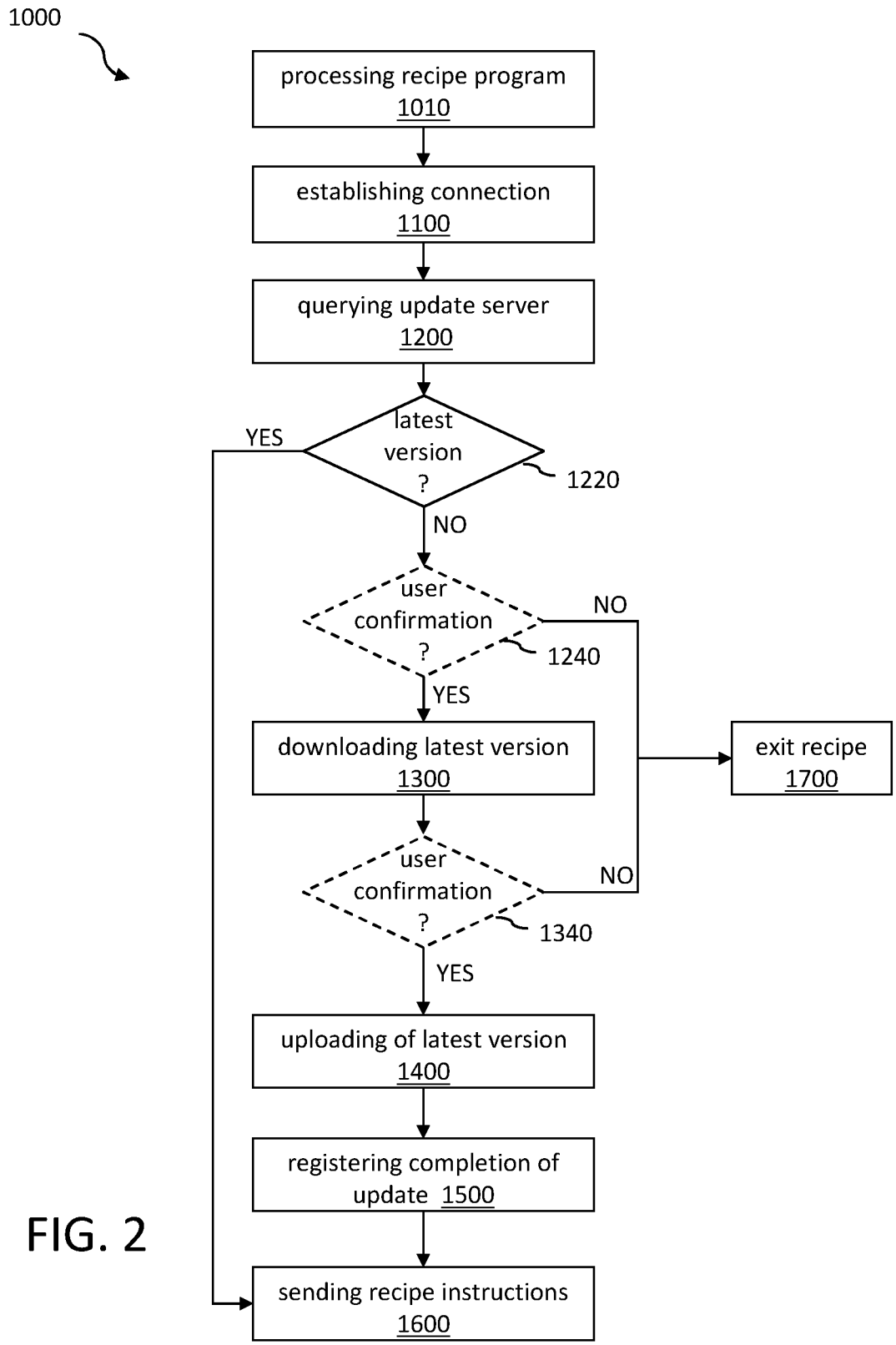
FIG. 2 is a simplified flow chart illustrating a computer-implemented method for updating the firmware of a cooking apparatus used in a joint cooking process.

FIG. 1A illustrates a first (lead) cooking apparatus 100 with two further cooking apparatuses 220, 230 in a joint cooking process example scenario according to an embodiment. FIG. 2 is a simplified flow chart of a computer implemented method 1000 for performing a firmware update on one of the further cooking apparatuses. FIG. 1A is described now in the context of FIG. 2. For this reason, reference numbers of FIG. 1A and FIG. 2 are used in the following description.

Figure 1B:
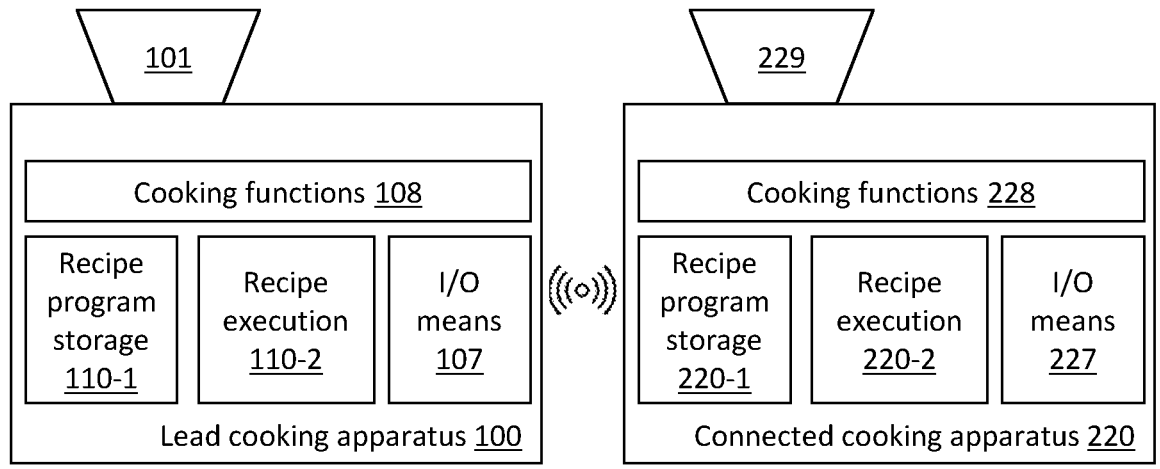
FIG. 1B illustrates details of a lead cooking apparatus and a connected further cooking apparatus according to an embodiment.

In the example, the lead apparatus 100 is a multifunction cooking apparatus which supports a plurality of cooking functions. In the example, lead apparatus 100 has an interface which is adapted to receive a bowl 101 with an integrated heating-and-stirring element. Turning briefly to FIG. 1B, the lead apparatus 100 can perform different cooking functions 108, such as for example, heating, boiling, frying, stirring, mixing, and chopping. Further, the lead apparatus 100 has a recipe control function 110 with a recipe program storage 110-1 where a recipe program 111 can be stored for execution using a recipe execution engine 110-2. For example, the recipe program 290 can be downloaded from a recipe storage 290 (e.g., a remote recipe server communicatively coupled with the lead apparatus 100, or simply a removable storage device, such as a USB stick or an SSD card, cf. FIG. 1A). Further, the lead cooking apparatus may have I/O means 107 which allow a user 1 to interact with the first cooking apparatus 100 via an appropriate user interface (e.g., a graphical UI with touch screen functionality, a voice driven UI, a keyboard or any combination thereof).

The lead apparatus 100 is communicatively coupled with one or more further cooking apparatuses. In the example scenario of FIG. 1A, the lead apparatus 100 is connected via a short-range wireless communication protocol (e.g. Bluetooth, ZigBee, WiFi, UWB, etc.) with a second cooking apparatus 220 and with a third cooking apparatus 230. In the example, the second cooking apparatus can receive a bowl 229 similar (or even identical) to bowl 101 of the lead apparatus 100. It is to be noted that the second cooking apparatus 220 may also receive other cooking pots or pans with an appropriate interface (similar to the cooking apparatus 230 with pan 239). Vice versa, the cooking apparatus 230 can be configured similar to the cooking apparatus 220. FIG. 1B illustrates a similar component structure of the second cooking apparatus 220 (slave). It also has a recipe program storage 220-1 for storing recipe program instructions and a recipe execution engine 220-2 for executing such instructions. It also may use I/O means 227 to provide for interactions with the user 1. The functional scope of cooking functions 228 may differ from the functional scope of the cooking functions 108 of the lead apparatus 100.

Turning back to FIG. 1A, typically the lead apparatus 101 supports a broader range of cooking functions than the connected cooking apparatuses 220, 230. For example, the lead apparatus 100 may support a higher maximum rotational speed of the stirring element, or a higher maximum temperature of the heating element than the second cooking apparatus. Therefore, the lead apparatus may require additional safety functions for the bowl 101, such as a lid 109 with lid fastenings l1, l2 which may cover the bowl when the stirring element is rotating at high speed in a hot liquid to prevent the spilling of hot liquid by the lead apparatus in operation. The second cooking apparatus may support only lower temperatures and lower rotational speed of the stirring element so that the bowl can be operated without additional safety means. The third cooking apparatus 230 controls a smart pan 239 which may only support a heating function. However, the second cooking apparatus may also support cooking functions which are not necessarily supported by the lead apparatus. For example, the lead apparatus may have stirring element which does not support chopping, whereas the second apparatus may support chopping, too. The user 1 may interact with any of the cooking apparatuses during the joint cooking process via corresponding I/O means.

The cooking apparatuses 220, 230 use respective firmware 221, 231 as operating systems to provide the low-level control for the specific hardware of the respective cooking apparatuses. In the example, the firmware 221 of the second cooking apparatus 220 has the firmware version number #221. It is assumed that the lead apparatus 100 has downloaded recipe program 111 and has started to process 1010 the recipe program with its execution engine. While processing the recipe 111, lead apparatus 100 detects that the recipe program 111 includes some instructions for a further cooking apparatus to perform a particular cooking function. In the example, a sauce is to be prepared by one of the further cooking apparatuses which is to be added to the bowl 101 of the lead apparatus at a particular point in time. The required cooking function of the further cooking apparatus is a heating and stirring function for preparing the sauce. The smart pan 230 does not provide such a cooking function. However, the second cooking apparatus 221 has a heating-and-stirring element integrated in bowl 229 and can, in principle, perform the required operating function. The heating-and-stirring function allows to perform stirring up to a speed level 3 and heating up to a maximum temperature of 60° C.

However, the recipe program has a recipe instruction for the further cooking apparatus to perform heating and stirring at speed level 2 and a temperature of 75° C. for five minutes. Therefore, the lead apparatus concludes that with the available cooking apparatuses the recipe could not successfully be executed because the required temperature cannot be reached by the second cooking apparatus 220. The lead apparatus establishes 1100 a connection with the second cooking apparatus 220 to query the second cooking apparatus for the current firmware version number of the currently installed firmware 221 with the intention to check if perhaps a firmware update is available which could upgrade the second cooking apparatus in such a way that it can perform the desired cooking function (heating at 75° C.). The lead apparatus activities in relation to firmware updates for connected cooking apparatuses may be performed by a firmware update module 120 of the lead apparatus.

It is assumed that the first and second cooking apparatuses 100 and 220 had been paired already in the past via the used short-range wireless connection protocol (e.g., Bluetooth), and that for this reason the second cooking apparatus with its supported cooking functions had already been registered with the lead apparatus. Therefore, the lead apparatus may prompt the user 1 to just switch on the second cooking apparatus for establishing the connection for retrieving the firmware version number. The second cooking apparatus 220 provides the version number #221 to the lead apparatus 100 and the lead apparatus forwards the obtained version number to the update server 200 (together with a device identifier and/or a device type identifier 2201D of the second cooking apparatus 220) to query 1200 the update server for the latest available firmware version for the second cooking apparatus. A check if the installed version is the latest available firmware version for the second cooking apparatus may be performed by the update server 200 itself or the update server may simply forward the version number of the latest available firmware version to the lead apparatus for performing said check.

The update server 200 stores firmware versions 210 for all kinds of cooking apparatuses which may connect to the lead apparatus. The firmware versions may be stored for a particular device type 2201D or for groups of device types which share a common hardware platform. The lead apparatus provides the relevant type information for the update server 200 when sending the version query 1200.

If the latest firmware version 221n for the second cooking apparatus 220 differs from its current firmware version 221, optionally the lead apparatus may ask 1240 the user 1 to confirm whether the new version 221n should be installed. The user may reject the firmware update when deciding that the recipe 111 should not be executed. In this case, the lead apparatus will exit 1700 the recipe program 111. If the user confirms (YES) that the firmware update should be executed, the lead apparatus downloads 1300 the latest firmware version 221n from the update server 200.

The lead apparatus 100 may skip the confirmation step 1240 and always download 1300 the latest firmware version if it is newer than the currently installed version 221. This may be performed in the background so that the user 1 is not affected when interacting with the cooking apparatuses. In this case, the lead apparatus may ask 1340 however for a user confirmation before the downloaded firmware version 221n gets uploaded 1400 to the to the second cooking apparatus 220. Again, the user may reject the firmware update and decide that the recipe 111 should not be executed. In this case, the lead apparatus will exit 1700 the recipe program 111. If the user confirms (YES) that the firmware update should be installed, the lead apparatus uploads 1400 the latest firmware version 221n to the second cooking apparatus. Alternatively, the lead apparatus may be configured (e.g., via respective user settings) that no user confirmation for firmware updates is required at all. In this case, the previously described check 1220 for a newer version, downloading 1300 the newer version and uploading 1400 the latest version would always be performed fully automatically by the lead apparatus 100.

The uploading 1400 of the latest firmware version 221n to the second cooking apparatus 220 is thereby performed such that the joint cooking process is not negatively affected with regard to the final cooking result. That is, any interruption of the joint cooking result that would lead to a delay regarding the finishing time of the joint cooking process, or to a reduced food quality of the joint cooking result, is prevented by using any of the embodiments described in detail in FIGS. 3A to 3C for uploading the latest firmware version to the second cooking apparatus 220.

Once the firmware update is completed, the lead apparatus registers 1500 completion of the firmware update after receipt of a confirmation from the second cooking apparatus. In some embodiments, the firmware update requires a reboot of the second cooking apparatus. In these embodiments, the request by the second cooking apparatus for reconnecting to the lead apparatus can be interpreted by the lead apparatus as said confirmation by the second cooking apparatus. In another embodiment, the firmware update is performed on the fly during operation of the second cooking apparatus (without reboot). In this case, the second cooking apparatus may simply send a confirmation message to the lead apparatus once the firmware update is completed.

In response to such confirmation, the lead apparatus finally sends 1600 the recipe instructions to the second cooking apparatus which cause the second cooking apparatus to perform the particular cooking function which requires the firmware update. By executing the respective instructions of the recipe program 111, the second cooking apparatus 220 continues with the execution of the particular cooking function and thus contributes to the successful completion of the joint cooking process.

Figure 3A:
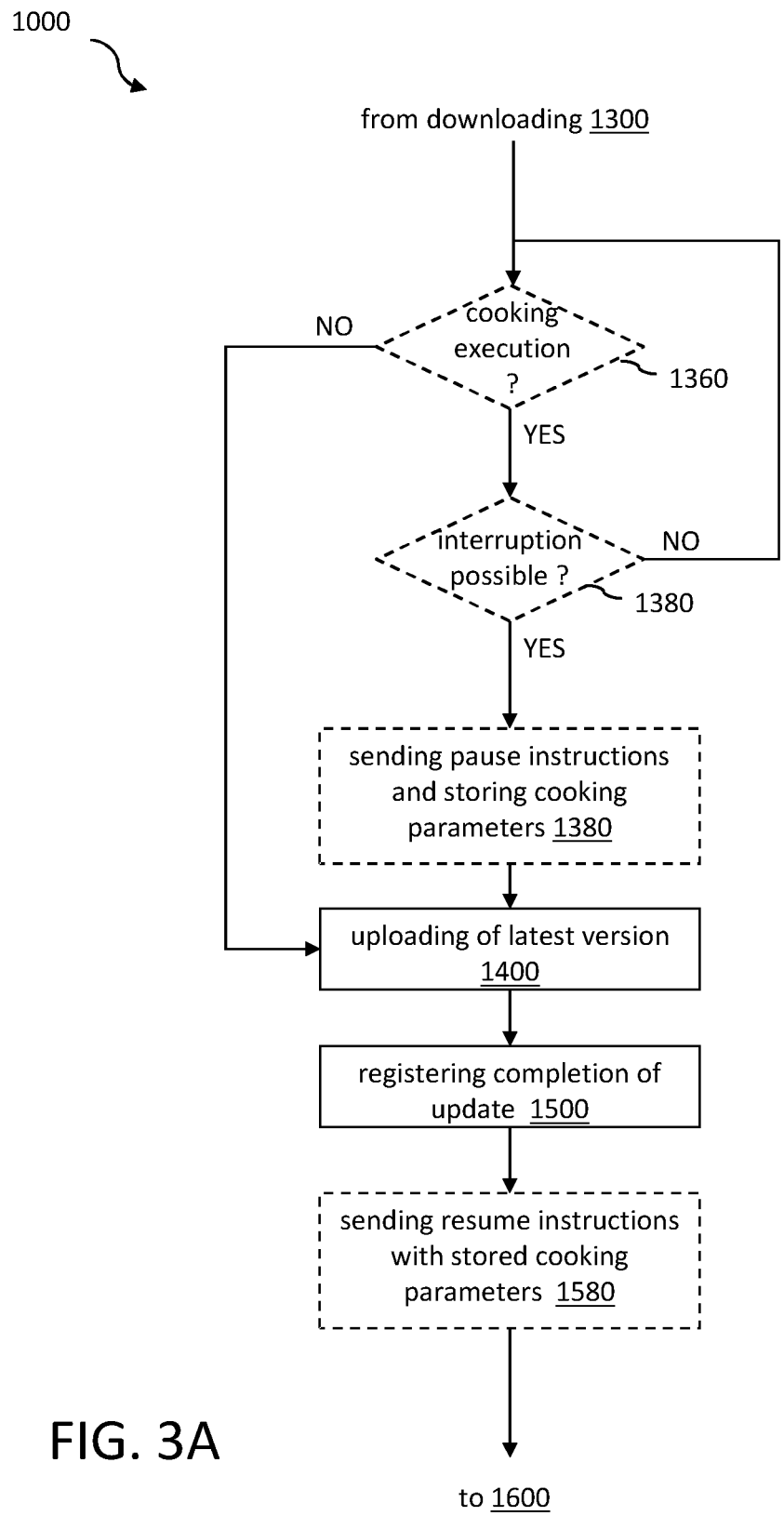
FIGS. 3A to 3C are simplified flowcharts illustrating alternative embodiments of the computer-implemented method for firmware updating while preventing interruption of the joint cooking process.
Figure 3B:
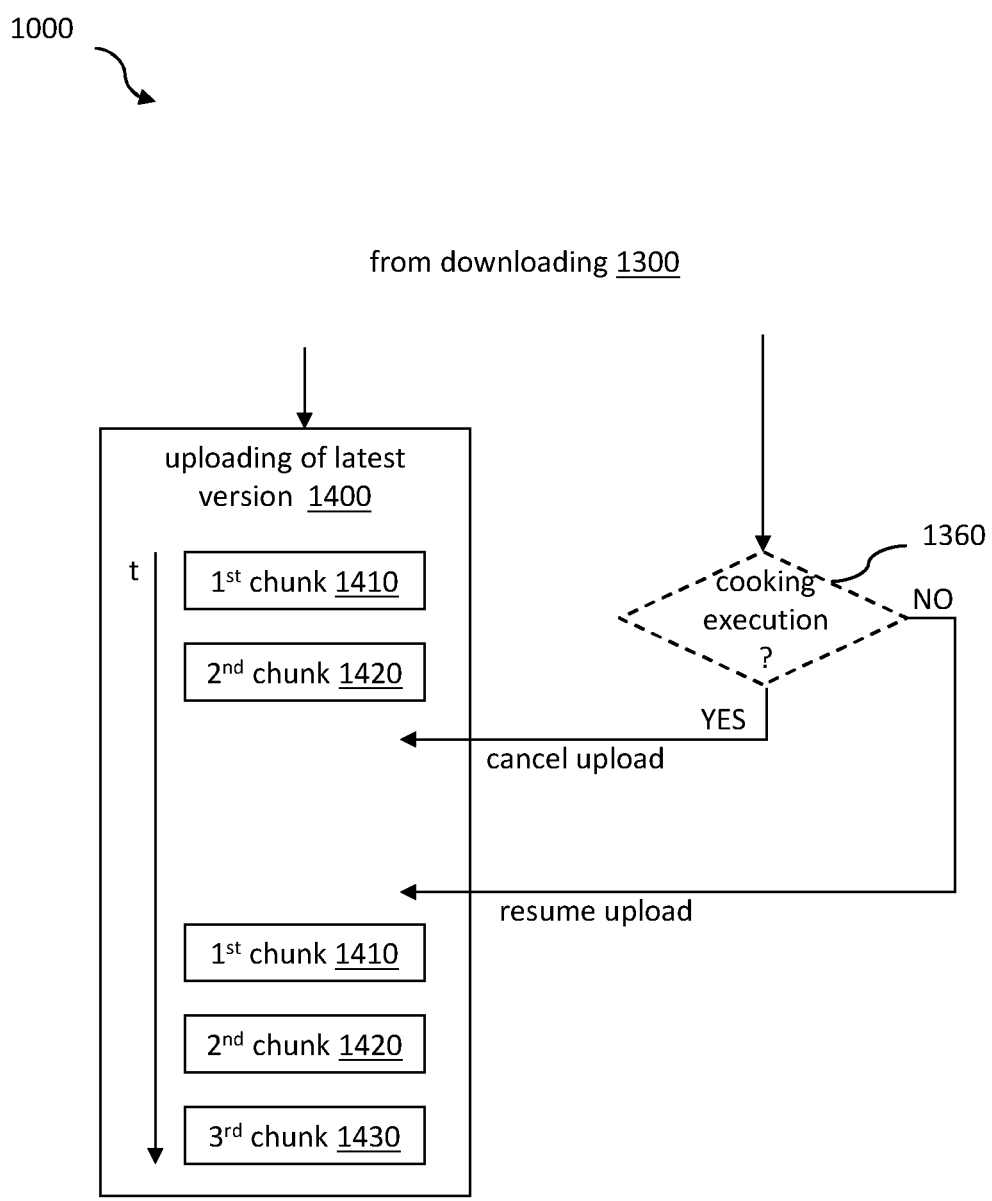

FIGS. 3A to 3B are simplified flowcharts illustrating alternative embodiments of the computer-implemented method 1000 for firmware updating while preventing interruption of the joint cooking process. In FIG. 3A, a scenario is depicted where an ongoing cooking function of the second cooking is interrupted in case that the joint cooking process is not negatively affected by this interruption. In this embodiment, the lead apparatus detects 1360 if there is a current execution of a cooking function performed by the second cooking apparatus. For example, before starting the upload 1400 of the latest firmware version, the lead apparatus may query the second cooking apparatus for a status update. If the status indicates no cooking execution, the upload can be started right away. If an ongoing cooking function is indicated in the status update, the lead apparatus determines if the respective cooking function can be interrupted without negatively affecting the joint cooking process.

For example, the recipe 111 may include flags for respective recipe instructions which indicate whether the corresponding cooking function or cooking action is interruptible or not. Table 1 shows examples of recipe instructions with corresponding flags for interruptible (I) and non-interruptible (NI) cooking actions. The bold printed sections are the machine-readable instructions to be executed by the second cooking apparatus. Such instructions typically include control parameters for the cooking functions supported by the second cooking apparatus (e.g., an operation mode such as chop, sauté, cook, etc., a temperature value for the heating element, a time value for the duration of the cooking action, a speed value for the rotational speed of the stirring element).

TABLE 1 recipe instruction examples in an example recipe for a starter

| recipe instructions | interruptibility |
|---|---|
| Place garlic clove, onions and carrot into mixing bowl and chop 3 sec/speed 5 | I |
| Add butter and sauté 3 min/120 C./speed 1 | NI |
| Add tomatoes, salt and dried oregano and chop 5 sec/speed 5 | I |
| Add water, stock cube and cook 15 min/100 C./speed 2 | NI |

Alternatively, the recipe instructions may be assigned to cooking functions (e.g., cream whipping, chopping, cooking, etc.) and a look-up table defines interruptibility for the respective cooking functions.

If no interruption is possible (NI), the second cooking apparatus just continuous with the execution of the current cooking execution. If however an interruption is possible without risking the food quality of the respective cooking function output, the lead apparatus checks if, in case of an interruption for the duration of the firmware installation procedure, the second cooking apparatus can still deliver the final result of the cooking function in due time so that the overall recipe execution of the joint cooking process is not delayed or otherwise negatively affected because of the firmware update. For this assessment, the lead apparatus can use firmware update durations of past installations and a certain buffer time interval as a safety buffer. Such firmware update duration is then added to the time of the interruptible cooking action. If this aggregate time interval (time for cooking action+time for firmware update) is smaller or equal to the time slot available for the second cooking apparatus to complete said cooking action in accordance with the recipe for the joint cooking process, then the ongoing cooking function/action can be interrupted. Otherwise, the ongoing cooking function is continued until finished. In case of interruption, the lead apparatus sends 1380 pause instructions to the second cooking apparatus and stores the current cooking parameters. While the second cooking apparatus is pausing, the lead apparatus uploads 1400 the latest firmware version to the second cooping apparatus. Depending on the communication protocol such upload may be performed in one shot or chunk-wise. Once the firmware update is completed and the completion is registered 1500 by the lead apparatus, the lead apparatus sends 1580 instructions to the second cooking apparatus to resume recipe execution with the stored cooking parameters. It is to be noted that the completion of the firmware update may require a reboot of the second cooking apparatus before the interrupted cooking function can be resumed. In this case, the time interval for the reboot needs to be included in said aggregate time interval.

Figure 3C:
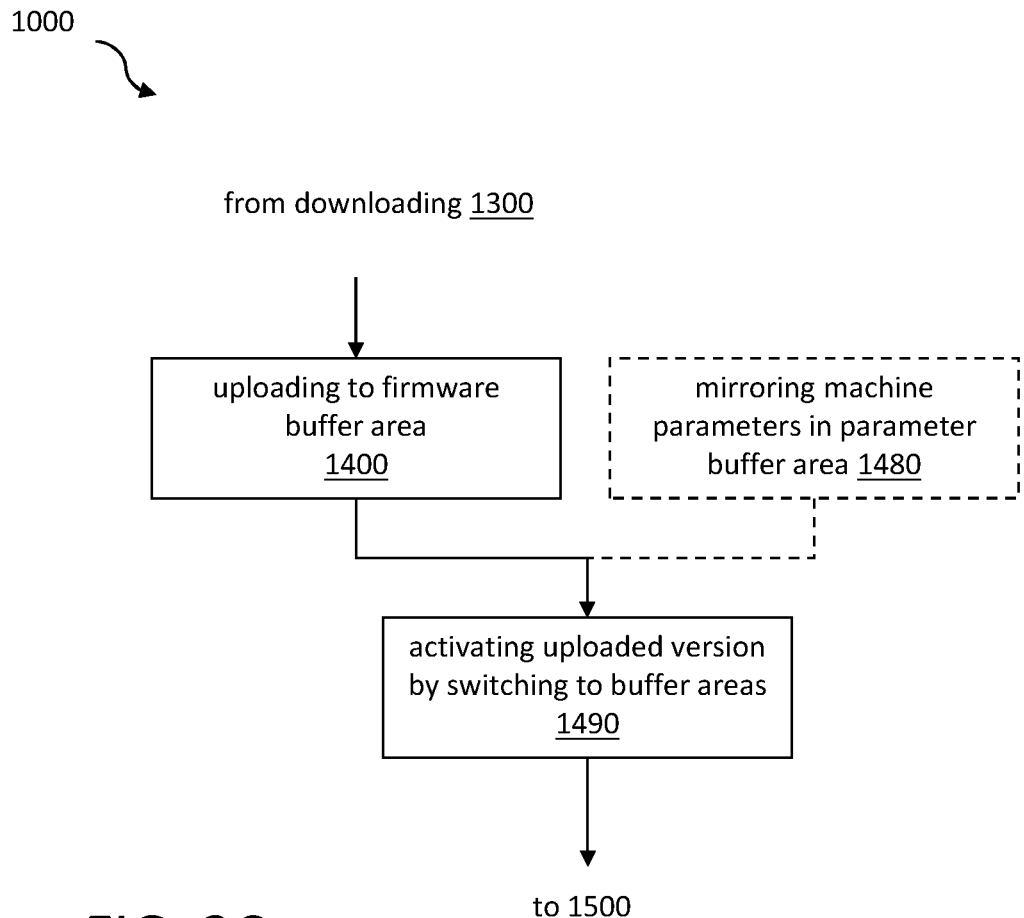

The alternative embodiments of method 1000 as illustrated in FIGS. 3B and 3C allow to perform the firmware update such that any interruption of an ongoing a cooking function performed by the second cooking apparatus is prevented entirely.

In the embodiment shown in FIG. 3B, the lead apparatus has started a firmware upload 1400 at a moment when the second cooking apparatus was idle (i.e., no ongoing cooking function was performed by the second cooking apparatus). In the example, a chunk-wise upload method is used and the $1^{st}$ and $2^{nd}$ chunks 1410, 1420 were already uploaded when the lead apparatus detects 1360—YES the start of a cooking action of the second cooking apparatus (e.g., the heating function is turned on and the lead apparatus is informed that the current ingredients in the second cooking apparatus will be kept at a certain temperature for a certain time interval). The lead apparatus may immediately cancel the firmware uploading and resume uploading when the second cooking apparatus has terminated 1360—NO the current execution. In the example, all chunks 1410, 1420, 1430 are uploaded again. Alternatively, the upload could continue only with the not yet uploaded chunk 1430. This embodiment could be combined an interruptibility check 1380 as described in FIG. 3A. In such an embodiment, if the detected cooking action is interruptible, the lead apparatus may decide to finish the firmware update first and pause the detected cooking execution until the firmware update has been confirmed by the second cooking apparatus.

Figure 5:
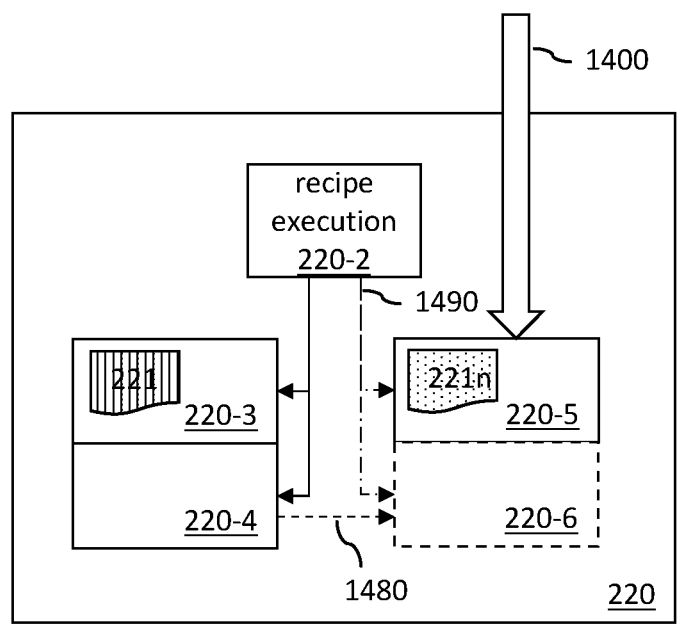
FIG. 5 illustrates an embodiment for installing a firmware update during a cooking operation of the cooking apparatus.

In the embodiment shown in FIG. 3C and FIG. 5, the lead apparatus sends 1400 the latest firmware version 221*n* to a firmware buffer 220-5 of the second cooking apparatus 220 while the second cooking apparatus 220 is operating on the current firmware version 221 which is stored in a separate firmware memory 220-3. This is indicated by the solid arrow from the execution engine 220-2 to the firmware memory 220-3. The firmware buffer 220-5 is not affecting the current cooking operation of the second cooking apparatus. Further, the second cooking apparatus has a machine parameter buffer 220-6 for mirroring 1480 current machine parameters of the current cooking operation stored in the parameter memory section 220-4. That is, the mirrored parameter buffer 220-6 is in possession of the current operating parameters of the second cooking apparatus at any point in time during execution of any cooking function performed by the second cooking apparatus. After the completion of the firmware upload 1400, the second cooking apparatus 220 activates 1490 the latest firmware version 221n during the execution of the current cooking operation (without any interruption) by switching the memory access of the recipe execution from one memory area to another memory area (220-3→220-5; 220-4→220-6) in the second cooking apparatus. In FIG. 5, the solid arrows represent the current memory pointers before the completion of the firmware update, and the dashed arrows represent the switched memory pointers after the firmware update completion. This pointer switch can be performed instantaneously so that the memory area 220-3 with the current firmware 221 is switched to the corresponding memory address in the firmware buffer 220-5 and the memory area with the current machine parameters 220-4 is switched to the corresponding memory address in the machine parameter buffer 220-6. This embodiment allows a seamless firmware update process by performing the firmware upload while the second cooking apparatus is in operation without disturbing the joint cooking process at all. After the pointer switch, the previous firmware memory may become the firmware buffer for future firmware updates, and the previous machine parameter memory may become the machine buffer parameter for mirroring the current machine parameters. As this embodiment does not require a reboot of the second cooking apparatus, the second cooking apparatus simply sends a "update completed" notification to the lead apparatus.

The embodiment in FIG. 5 is advantageous in comparison to an embodiment which provides redundancy for all relevant system components such as CPU, memory, etc. In such an implementation, the second cooking apparatus could run the cooking actions on the first set of system components while updating the firmware for the second set of system components. The second set of system components can then reboot without affecting the ongoing cooking action. After the reboot, the current configuration and machine parameter values can be loaded and the current control lines can be taken over by the second set of system components after the reboot. The cooking action is the seamlessly continued by the second set of system components. The current state of the second cooking apparatus is unambiguously described by its current configuration in combination with the current state of the control lines. However, providing an entire second set of system components solely for the purpose of redundancy is leading to a complex and costly system structure. The embodiment of FIG. 5 is a light version for implementing advantageous redundancy only for such system components which are relevant in the context of performing seamless firmware updates. For implementing such a light redundancy system, the low-level controls can be swapped out to a separate hardware chip. The low-level control (e.g., for motor control, heat control, timer control, etc.) via this chip continues when executing a respective cooking action. In this implementation, redundancy is only required with regard to this separate hardware chip for performing a seamless update in accordance with the embodiment shown in FIG. 5.

To summarize, when providing two memory areas with the first memory area storing a defined set of configuration data, and the second memory area storing a complex state machine for operating the second cooking apparatus, the complex state machine can be updated via the firmware update and be brought into sync by using said configuration data.

It is to be noted, that firmware updates may also be performed for multiple connected cooking apparatuses in parallel. For all firmware embodiments, the status of the firmware update installation progress may be indicated to the cooking user via a user interface of either the lead apparatus or the second cooking apparatus. For example, the lead apparatus may include a graphical UI indicating a progress bar or respective notification messages to the user. For example, the user may be informed that an update process has been interrupted because a cooking action was started on a respective cooking apparatus. It may also inform the user that a firmware update is currently in progress for a particular cooking apparatus and that no cooking actions may be started before the update is completed. Of course, a notification about successful completion of the firmware update may also be communicated to the user. Typically, such user feedback about the current status of the affected cooking apparatus(es) is provided via the lead apparatus because it typically has the most advanced user interaction capabilities (e.g., speakers, touch screen, etc.). However, it can be advantageous to provide the firmware update information via the user interface of the cooking apparatus being updated to avoid the need for communicating the current update status to the lead apparatus. For performing the update under the control of the lead apparatus, it is sufficient to communicate to the lead apparatus the status regarding ongoing cooking functions and the notification about completion of the firmware update. Intermediate status information for the user can therefore be indicated to the user on the second cooking apparatus without additional communication with the lead apparatus.

Figure 4:
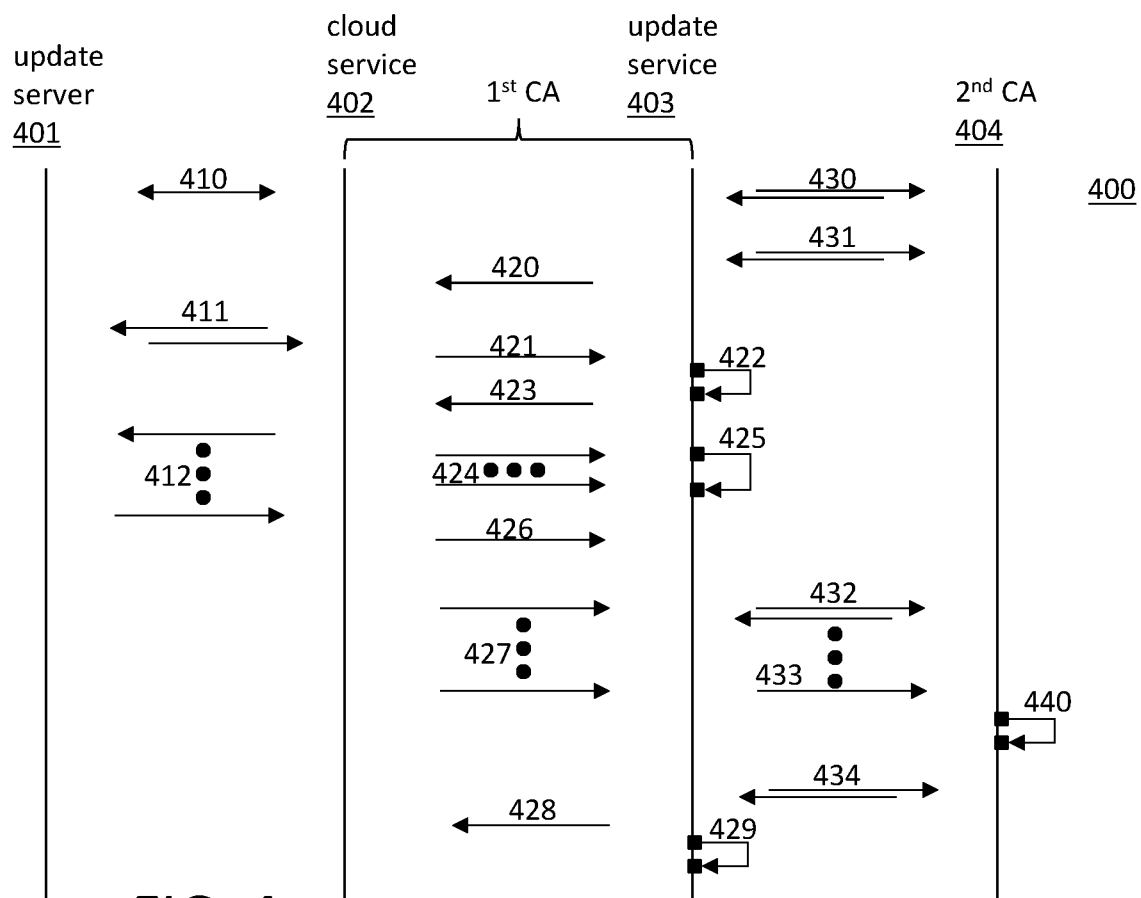
FIG. 4 is a swim lane diagram illustrating, by way of example, a communication protocol for updating the firmware of a cooking apparatus under the control of a lead apparatus.

FIG. 4 is a swim lane diagram 400 with the vertical lines representing a communication interface 401 of the update server, a cloud service interface 402 and an update service interface 403 of the lead apparatus $1^{st}$ CA, and a communication interface 404 of the second cooking apparatus $2^{nd}$ CA. The cloud service interface 402 is an internal software component which controls the communication with the update server. For example, the cloud service interface may prioritize different requests to the update server (e.g., implemented as a cloud server). The arrows illustrate an example protocol for performing a firmware update on the $2^{nd}$ CA under the control of the $1^{st}$ CA. During an initialization phase, a communication is established 410 between the update server 401 and the cloud service 402. The update service 403 detects 430 if the $2^{nd}$ CA is ready to participate in a joint cooking process (e.g., whether the $2^{nd}$ CA is switched on). The arrow pairs (e.g., 430, 431, etc.) in FIG. 4 thereby indicate that there may be a request-response cycle in the communication.

For example, for establishing the communication between the update service 403 and the $2^{nd}$ CA 404, the lead apparatus may first send an instruction to switch on the $2^{nd}$ CA and then receive a corresponding confirmation from the $2^{nd}$ CA. After the communication between the lead apparatus and the $2^{nd}$ CA has been established, the lead apparatus retrieves 431 the current firmware version number of the $2^{nd}$ CA. The 1st CA then determines whether there is a newer firmware version available at the update server 401. In the example protocol, the 1st CA forwards 420, 411 the received version number to the update server 401 which provides 411 the information about the latest available firmware version to the cloud service 402. Advantageously, the respective device identifier and/or device type identifier 2201D are also provided.

The 1st CA then determines 421 that the latest available version is a newer version than the currently installed firmware version and (optionally) prompts 422 the user with the question whether the latest update version should be installed. In the example, the user confirms and the 1st CA generates 423 a request for downloading the latest version which triggers the download 412 of the latest version via the cloud service 402. While the download is ongoing, the latest firmware version is continuously stored 424 on the 1st CA. In the example, a progress update is communicated 425 to the user who is finally informed 426 that the download has been successfully completed. In the example, a chunk-wise upload protocol 427, 432 is used to upload the latest firmware version to the 2nd CA 404. After the upload of the final chunk 433, the 2nd CA is rebooting to activate the latest firmware version. After the reboot, the update service 403 is notified 434 about the completion of the firmware update and the latest version is registered 428 by the 1st CA and published 429 by the update service 403.

Figure 6:
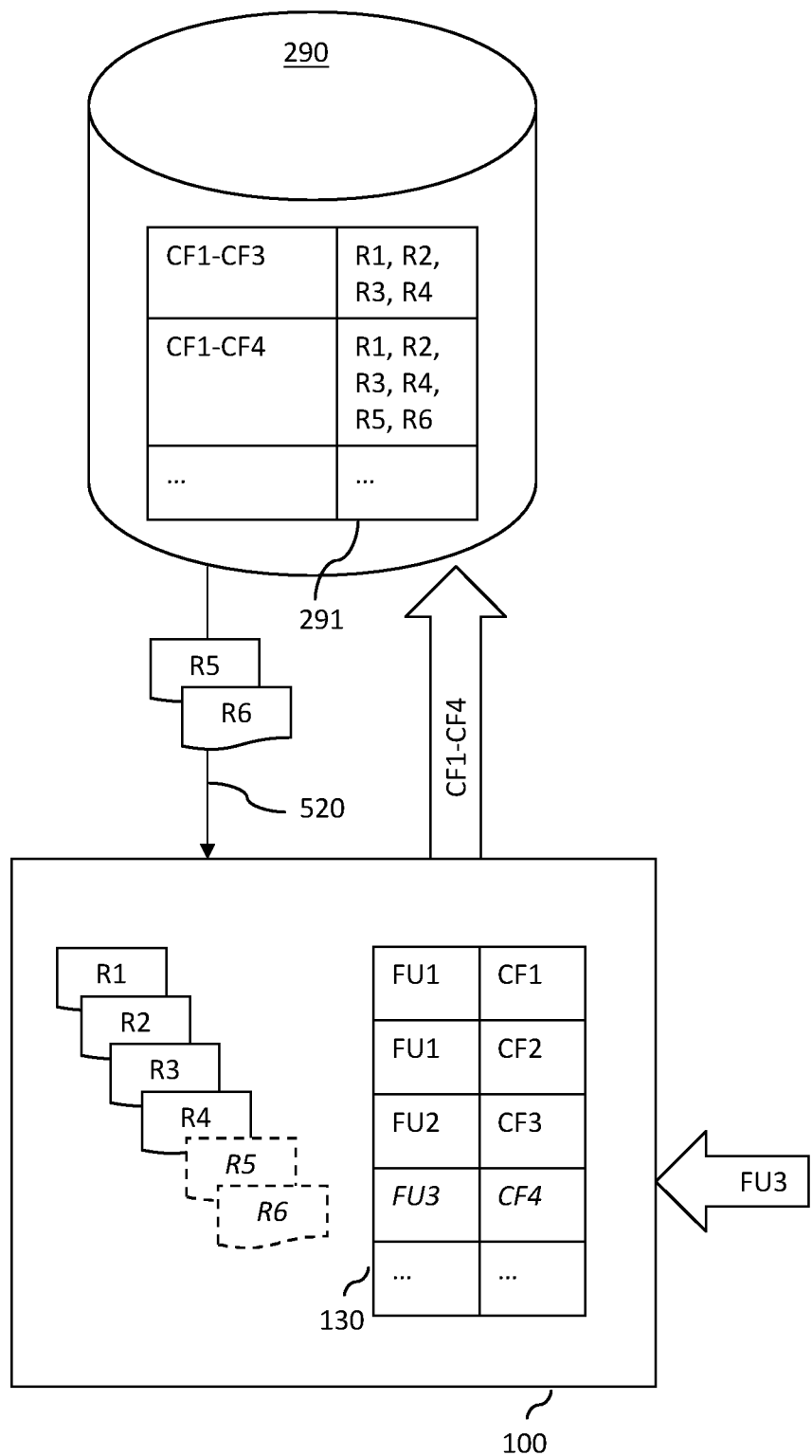
FIG. 6 illustrates providing additional recipes enabled by a new firmware version.

When the lead apparatus is querying the recipe storage for recipes, a filter may be applied to the suggested recipes so that recipes become downloadable to the lead apparatus only if the available cooking functions (provided by the lead apparatus and any connected cooking apparatus) allow the successful execution of the downloaded recipe. FIG. 6 illustrates an example of this embodiment showing the enablement of an additional cooking function by a respective firmware update. In the example, lead apparatus 100 has just received a firmware update completion notification (horizontal arrow) for a firmware version FU3 from a connected cooking apparatus. The lead apparatus uses a data structure 130 which tracks the installed firmware updates for all cooking apparatuses available for joint cooking processes. Further, the data stores additional cooking functions which become available by the respective firmware updates. For simplicity, only the firmware updates for a particular cooking apparatus are shown in data structure 130. A skilled person knows how to extend the data structure to all available cooking apparatuses. In the data structure example, firmware update FU1 released cooking functions CF1 and CF2 for the particular cooking apparatus. Firmware update FU2 additionally released cooking function CF3. Before the completion of firmware update FU3, the lead apparatus can only download the recipes R1 to R4 from the recipe storage 290 as in the recipe filter 291 only these recipes are indicated as executable with the cooking functions CF1 to CF3 (enabled by the firmware updates FU1 and FU2. After completion of firmware update FU3, a new cooking function CF4 is enabled and added to the data structure 130. The lead apparatus 100 can then query 510 the recipe storage 290 for available recipes with the extended range of cooking functions CF1 to CF4. The filter 291 provides the information that the additional recipes R5, R6 can now be downloaded 520 as they can be successfully executed with the additional cooking function CF4. After the download 520, the additional recipes R5, R6 are available to the recipe execution engine of the lead apparatus to be executed in a joint cooking process.

In an alternative implementation, the filter 291 of the recipe storage 290 may directly use assignments of recipes to respective firmware versions. In this implementation, the lead apparatus 100 only needs to transmit the current firmware version numbers to the recipe storage and the recipe storage can provide the respective executable recipes for download.

In one embodiment, a firmware update may enable the updated cooking apparatus to perform a particular cooking function within the joint cooking process such that the food quality of a respective food component is improved (e.g., producing whipped cream with improved food texture), or such that the overall cooking time of the joint cooking process is reduced. For example, by enabling a higher rotational speed of the stirring/chopping element with a corresponding firmware update, the execution of the chopping function may be shortened and an adjusted recipe program may be offered by the recipe storage accordingly. In this case, the recipe storage may also provide recipe program updates for recipes which had already been downloaded by the lead apparatus in the past. This allows the lead apparatus to identify and download improved versions of already downloaded recipe programs depending on the update status of firmware used by the connected cooking apparatus(es).

The invention claimed is:

1. A computer-implemented method for updating firmware of a second cooking apparatus under the control of a first cooking apparatus, the first cooking apparatus associated with a recipe control function which controls recipe execution by the first and second cooking apparatuses in a joint cooking process, the method comprising:
   while the first cooking apparatus is processing a recipe program which comprises recipe instructions to be executed by the second cooking apparatus for performing a particular cooking function in the joint cooking process, establishing a communication connection between the first and second cooking apparatuses;
   querying an update server to check whether a current firmware version of the second cooking apparatus corresponds to a latest available firmware version supporting the particular cooking function;
   if the latest available firmware version differs from the current firmware version,
      downloading the latest firmware version to the first cooking apparatus;
      uploading the downloaded latest firmware version to the second cooking apparatus for execution of a firmware update at the second cooking apparatus using the downloaded latest firmware version, while preventing interruption of the joint cooking process;
      registering completion of the firmware update after receipt of a confirmation from the second cooking apparatus; and
   sending the recipe instructions for performing the particular cooking function to the second cooking apparatus to continue the joint cooking process by processing respective instructions of the recipe program.

2. The method of claim 1, wherein the current firmware version does not support the particular cooking function.

3. The method of claim 1, wherein the first and second cooking apparatuses support different functional scopes of cooking functions.

4. The method of claim 1, wherein a connection request for establishing the connection is detected in response to the second cooking apparatus being switched on.

5. The method of claim 1, wherein updating the firmware of the second cooking apparatus is performed in response to a user confirmation.

6. The method of claim 5, wherein downloading the latest firmware version is performed before receipt of the user confirmation.

7. The method of claim 1, wherein a current execution of a cooking function by the second cooking apparatus is detected before uploading, the method further comprising:
if interruption of the current execution of the cooking function for updating the firmware allows to finish the cooking function by the second cooking apparatus in that a result of the executed cooking function is provided to the first cooking apparatus in accordance with the recipe for the joint cooking process:
sending pause instructions to the second cooking apparatus and storing current cooking parameters;
starting uploading when the second cooking apparatus is pausing; and
upon termination of the firmware update, sending instructions to the second cooking apparatus to resume recipe execution with the stored cooking parameters.

8. The method of claim 7, wherein uploading is performed such that any interruption of an ongoing cooking function performed by the second cooking apparatus is prevented.

9. The method of claim 8, wherein uploading is cancelled when the current execution of a cooking function by the second cooking apparatus is detected, and wherein uploading is resumed when the current execution is terminated.

10. The method of claim 8, wherein the latest firmware version is sent to a firmware buffer of the second cooking apparatus, the firmware buffer not affecting a current cooking operation of the second cooking apparatus, the method further comprising:
upon completion of uploading, activating the latest firmware version during the execution of the current cooking operation by switching a memory area with the current firmware to the firmware buffer.

11. The method of claim 10, wherein the second cooking apparatus further has a machine parameter buffer mirroring current machine parameters of the current cooking operation, and wherein for activating the latest firmware version during the execution of the current cooking operation the memory area with the current machine parameters is switched to the machine parameter buffer.

12. The method of claim 1, further comprising:
after termination of the firmware update, providing further joint cooking process recipes to the first cooking apparatus wherein the further recipes require at least one cooking function which has been enabled for the second cooking apparatus by the firmware update.

13. A computer program product for updating firmware of a second cooking apparatus under the control of a first cooking apparatus, the first cooking apparatus associated with a recipe control function which controls recipe execution by the first and second cooking apparatuses in a joint cooking process, the computer program product comprising computer readable instructions embodied into a memory of the first cooking apparatus and executed by at least one processor of the first cooking apparatus cause the first cooking apparatus to perform operations comprising:
establishing a communication connection between the first and second cooking apparatuses, while the first cooking apparatus is processing a recipe program which comprises recipe instructions to be executed by the second cooking apparatus for performing a particular cooking function in the joint cooking process;
querying an update server to check whether a current firmware version of the second cooking apparatus corresponds to a latest available firmware version supporting the particular cooking function;
if the latest available firmware version differs from the current firmware version,
downloading the latest firmware version to the first cooking apparatus;
upload the downloaded latest firmware version to the second cooking apparatus for execution of a firmware update at the second cooking apparatus using the downloaded latest firmware version, while preventing interruption of the joint cooking process;
registering completion of the firmware update after receipt of a confirmation from the second cooking apparatus; and
sending the recipe instructions for performing the particular cooking function to the second cooking apparatus to continue the joint cooking process by processing respective instructions of the recipe program.

14. A first cooking apparatus for updating firmware of a second cooking apparatus, wherein the first cooking apparatus is associated with a recipe control function which controls recipe execution by the first and second cooking apparatuses in a joint cooking process, the first cooking apparatus being communicatively coupled with an update server providing firmware updates, the first cooking apparatus comprising at least one processor that causes the first cooking apparatus to:
establish a communication with the second cooking apparatus;
process a recipe program with recipe instructions to be executed by the second cooking apparatus for performing a particular cooking function in the joint cooking process;
retrieve a current firmware version of the second cooking apparatus;
query the update server to check if the current firmware version of the second cooking apparatus corresponds to a latest available firmware version for providing the particular cooking function;
if the latest firmware version differs from the current firmware version, download the latest firmware version;
upload the downloaded latest firmware version to the second cooking apparatus for execution of a firmware update at the second cooking apparatus using the downloaded latest firmware version, while preventing interruption of the joint cooking process;
register completion of the firmware update after receipt of a confirmation from the second cooking apparatus; and
send the recipe instructions for performing the particular cooking function to the second cooking apparatus to continue the joint cooking process by processing respective instructions of the recipe program.

15. The first cooking apparatus of claim 14, wherein the first cooking apparatus is paired with the second cooking apparatus via a short-range wireless communication protocol.

16. The first cooking apparatus of claim 15, wherein the communication with the update server is performed via a further communication protocol which is different from the short-range wireless communication protocol.

* * * * *